UNITED STATES PATENT OFFICE.

RICHARD C. GWATHMEY, OF LOUISVILLE, KENTUCKY.

IMPROVEMENT IN CYCLOPHORES.

Specification forming part of Letters Patent No. 165,818, dated July 20, 1875; application filed May 19, 1873.

*To all whom it may concern:*

Be it known that I, RICHARD C. GWATHMEY, of the city of Louisville, State of Kentucky, have invented a new and useful implement or machine, to be called the Cyclophore, for the purpose of holding and supporting objects, particularly cylindrical ones, and for other purposes; and I do hereby declare that the following is a full, clear, and exact description of the construction and operation of the same, reference being had to the annexed drawings, making a part of this specification, which, from Nos. 1 to 7, inclusive, are mathematical diagrams, illustrating the principles on which the machine is constructed; and Nos. 8 to 11, inclusive, are representations of the machine and its parts, more particularly to be described hereafter, premising the following mathematical principles, all of which principles requiring demonstration I have mathematically demonstrated:

*Principle 1st.*—That two fixed points are the greatest number through which an indefinite number of circles can be drawn.

Figure 1:
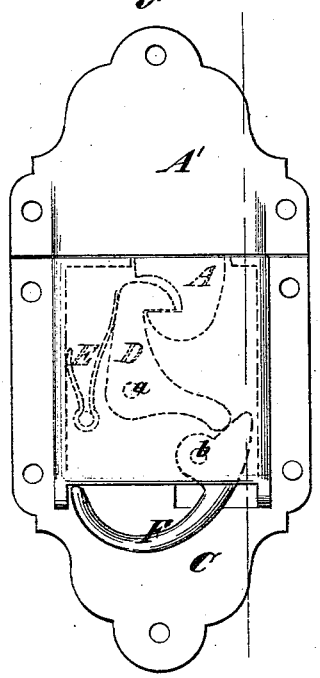

*Principle 2d.*—That if a straight line be drawn—as A B, Figure 1—to be called the median line, and in the same plane with such line two pairs of points, to be called the primary points, be taken—as C D and E F, Fig. 1—the points in each pair fixed relatively to each other, and so related that the lines to be called the connecting lines, connecting the respective points of each pair, shall be equal—as C D = E F, Fig. 1—which connecting-lines, produced if necessary, shall meet the median line A B in the same point as I, Fig. 1, while at the same time the median line shall be perpendicular to and shall bisect the line, to be called the transverse line, connecting the middle points of the two connecting-lines, as shown in Fig. 1, where G H is the transverse line bisected at K by the median line A B at right angles to it, then the four primary points C, D, E, and F, constituting the two pairs, will be in the circumference of a common circle, as shown in the diagram.

Figure 2:
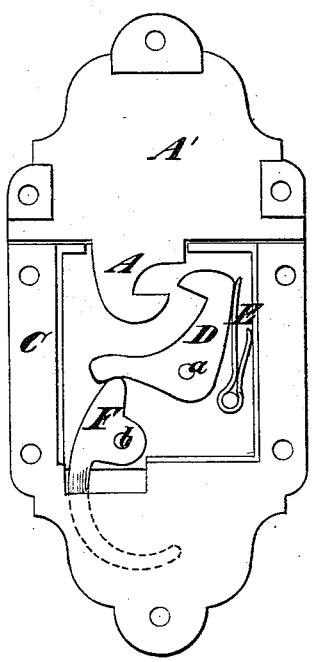

*Principle 3d.*—That in the case of two pairs of points so conditioned, if one or both pairs revolve around any point in the median line, taken at a finite or infinite distance, the four primary points will always be in the circumference of a common circle, as shown in Fig. 2, where A B is the median line, C D and E F the two pairs of points, and O in the median F the point or center of revolution. The line the point or center of revolution. The pair E F, when revolved to the position E' F', will be in the circumference of a circle passing through the points of the pair C D, supposed to remain stationary; and here, be it observed, that as the case is always precisely the same as regards the validity of the principles employed, whether one or both pairs of points revolve, for convenience we will, in the discussion, generally assume only one pair as moving. If the point of revolution be taken not in the median line, as at W, in Fig. 2, then the primary points will, in revolving, not be in the circumference of a common circle. If the point of revolution be taken in the median line, at an infinite distance, then the pair or pairs of points will in revolving describe arcs that are straight lines perpendicular to the median line.

Figure 3:
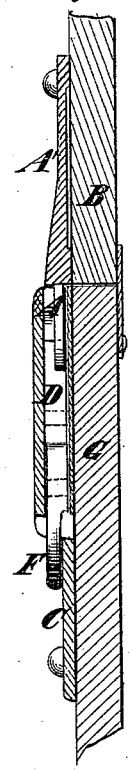

*Principle 4th.*—That a straight line, to be called the primary axis, perpendicular at a primary point to the basal plane—that is, the plane in which the primary points lie—will have all of its points exactly, and under all circumstances, as the primary point itself, as shown in Fig. 3, in perspective, where L M is the basal plane; A B, the median line; C D and E F, the primary points; and C N a primary axis, perpendicular to the basal plane at the primary point C; and the points of four such primary point axes passing through the four primary points that lie in any plane parallel with the basal plane will always be in the circumference of a common circle when the primary points themselves so lie, as shown in Fig. 4, in perspective, where L M is the basal plane; C N, D R, E S, and F T are the four primary axes; and U, V, X, and Y, the four points in those axes that lie in the plane Z Z parallel with the basal plane L M, which four points are in the circumference of a common circle, as the four primary points so lie as represented.

*Principle 5th.*—If around the four primary points, as centers, or around any four points in the four corresponding axes that lie in a plane parallel with the basal plane, four circles be drawn with any equal radius in the basal plane, or in any plane parallel with it, then the other glides, as in Fig. 10, &c. The curve between the applying bodies, as the curve between C and D, or between E and F, Fig. 8, must have, as its minimum recession, an arc of the smallest circle to be embraced by the machine, and the curve between the axillary surface and the applying body nearest thereto, as between F or D and e, Fig. 8, must have as its minimum recession, an arc of the largest circle to be embraced by the machine.

The applying bodies may be pillars, fixed, by their ends or sides, to the arms, or they may be held in position by lateral bars or in any other way; or they may be disks, or any other shape conformable to the before-mentioned essentials of an applying body. If they are pillars, they might have any shape in which a pillar can be turned in a lathe, as shown in Fig. 9. In the other case, where the point of revolution is not within practicable limits for the particular construction designed, or at a very great or an infinite distance, and we have only the working end of the machine at command, the applying bodies will have to be borne by carrying bodies of some sort to be held in position, and whose motion may be regulated by means of grooves, as in Fig. 10, in perspective, or ledges, or in any other way.

The forces employed may be considered of three kinds—an opening-force, a closing-force, and a fixing-force, to keep, when required, the machine at any given position. These forces may be manual, elastic, by means of springs or other elastic bodies, screws, pins, rings, or any other kind, and applied at any suitable points. In case where the work of the machine is to hold an object such object may have its surface that comes in contact with the applying bodies so formed that all parallel sections shall be circular around a common axis, and so that a section in the plane of its axis shall have an outline conformable to the outline of the applying bodies presented by a section through the plane of their axes, as represented in Fig. 11, where $i$ is an applying body, and $r$ is an object to be held by the machine. The object held may project upward or downward from the machine, or laterally between the applying bodies.

What I claim as my invention, and wish to secure by Letters Patent, is—

A combination of four bodies or systems of bodies, which will be called applying bodies, and which, in virtue of certain properties of size, shape, and position, will be effectual for holding objects, particularly objects formed with such surfaces as could be imparted by being turned in a lathe, and for other purposes. These properties are as to position, first, that the applying bodies shall be in relation each to an axis, which axis shall be perpendicular to the plane in which the bodies move; second, that these axes shall constitute two pairs; third, that the two constituent axes of each pair shall be fixed relatively to each other; fourth, that the distance between the axes of one pair shall be equal to the distance between the axes of the other pair; fifth, that one or both pairs of axes shall revolve around a point at a finite or infinite distance; sixth, that a radiant line from such point of revolution shall bisect at right angles a line connecting the middle point of a straight line, which connects the two of one pair with the middle point of a straight line which connects the two axes of the other pair, while at the same time the two straight lines connecting such axes shall, produced if necessary, meet the aforesaid radiant line at the same point. The properties as to size and shape are, first, that the four applying bodies shall have their sections that lie in the same plane perpendicular to their axes circular around their respective axes, and of the same diameter, at least, as to such of their surfaces as are applied to objects; second, any deviation from such size and shape to suit any particular purpose, such modification being available from the relation of the applying bodies to the above-described axes; and, third, that the objects to be held or acted upon by the applying bodies shall be formed in adaptation to the shape of the applying bodies when necessary, such applying bodies to be attached in any way to any machinery that will hold them in the required position, and communicate to them the required movement.

RICHARD C. GWATHMEY.

Witnesses:
LEWIS J. FRAZEE,
HORACE MAXWELL.

J. HALL.
Fastenings for Trunks, &c.

No. 165,820.　　　　　　　　　　　Patented July 20, 1875.

Witnesses,
John Becker
Fred Haynes

Joseph Hall
by his Attorneys
Brown & Allen

N. PETERS, PHOTO-LITHOGRAPHER, WASHINGTON, D C.